Dec. 19, 1922.
R. GOLPHIN.
CHAIN TIGHTENER.
ORIGINAL FILED SEPT. 27, 1920.
1,439,096.
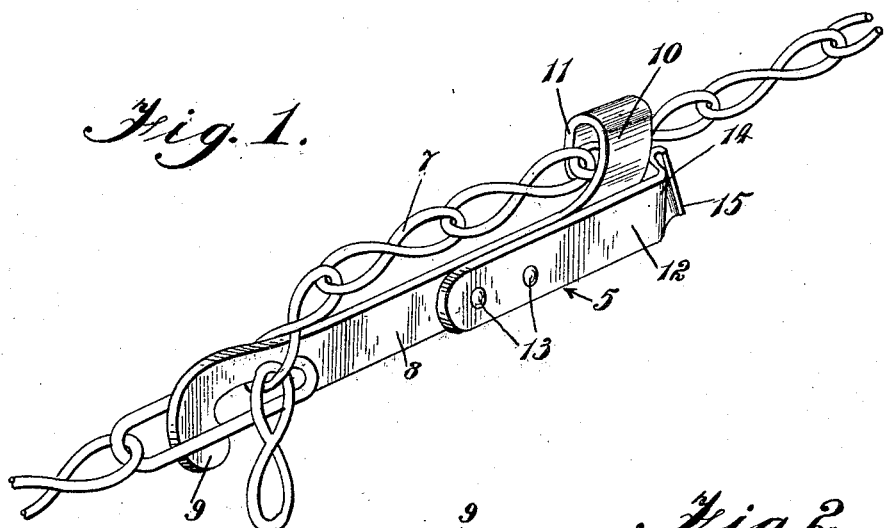
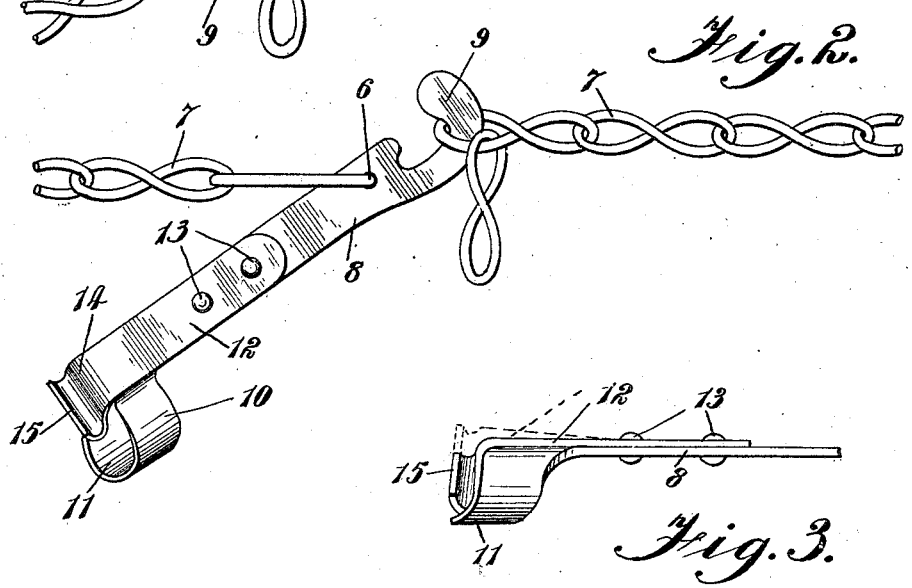
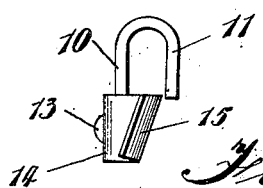
Inventor
Robert Golphin
By William C. Linton
Attorney Patented Dec. 19, 1922.

1,439,096

UNITED STATES PATENT OFFICE.

ROBERT GOLPHIN, OF BROWNSBURG, QUEBEC, CANADA.

CHAIN TIGHTENER.

Original application filed September 27, 1920, Serial No. 413,076. Divided and this application filed March 6, 1922. Serial No. 541,534.

*To all whom it may concern:*

Be it known that I, ROBERT GOLPHIN, a subject of the King of Great Britain, residing at Brownsburg, Province of Quebec, Canada, have invented certain new and useful Improvements in Chain Tighteners; and I do hereby declare that the following is a full, clear, and exact description of the invention, such as will enable others skilled in the art to which it appertains to make and use the same.

The present invention relates to new and useful improvements in clasps for tire chains, and is a division of my former application filed September 27th, 1920, Serial No. 413,076.

The primary object of the invention is the provision of a clasp for tire chains by means of which the chain ends can be readily connected and drawn to their desired taut positions.

Another object of the invention is the provision of means for retaining the chain ends in alignment after they have been secured together.

A further object of the invention is the provision of a clasp comprising a lever mechanism for tightening the chain ends and securing them together and a gripping means upon the opposite ends for holding the clamp and chain ends in alignment.

A still further object of the invention is the provision of a clasp such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more particularly described, claimed, and illustrated in the accompanying drawing, forming a part of the present application, and in which:

Figure 1 is a perspective view showing the clasp in engagement with the meeting ends of a chain;

Figure 2 is a side view thereof before the chain is tightened;

Figure 3 is a plan view of one end of the device, and,

Figure 4 is an end view of that portion of the device shown in Figure 3.

Referring now to the accompanying drawing by corresponding characters of reference throughout the several views, the numeral 5 designates in general my improved clasp shown attached as at 6 to one end of a tire chain or the like, designated by 7.

The clasp consists of an elongated bar of stiff material shown at 8, provided with a hook 9 adjacent the connecting point 6 of the chain 7, and at its opposite end the said bar is curved upwardly as at 10 and then bent downwardly upon itself as at 11 to form a guide for receiving the opposite end of the chain. A spring 12 is secured as at 13 by riveting or the like to the end of the bar 8 adjacent the above described guide, while the free extremity of the spring is bent as at 14 around the rear end of the guide partly closing the same, as shown in Figures 3 and 4, and is then bent backwardly upon itself as at 15 to provide a smooth edge against which the chain rides while being forced into the before described guide member.

In use, the device is particularly applicable for tire chains, but it is to be understood that it may be employed for any other purpose to which the various parts thereof will adapt themselves.

In applying the chain, the clasp is held in the position shown in Figure 2 with the hook terminal 9 through the desired link in the free end of the chain. The bar 8 is then drawn parallel to the chain, as shown in Figure 1, and the guide is forced downwardly past the chain which is received between the members 10 and 11 in which position the clamp is locked in alignment with the chain so as to prevent the chain from twisting past the said spring and guide.

It will be seen that the portion 15 of the spring is bevelled which permits the insertion of the spring into the guide member but prevents its displacement therefrom.

From the foregoing description, taken in connection with the accompanying drawing, it will be manifest that a clasp for chains and the like is provided, which will fulfill all of the necessary requirements of such a device, and it should be understood in this connection, that various minor changes in the specific details of construction can be resorted to within the scope of the appended claims without departing from the spirit or sacrificing any of the advantages of the invention.

Having thus fully described the invention, what I claim as new and desire to protect by Letters Patent is:—

1. A chain tightener of the character described comprising a bar, a hook at one end thereof, a U-shaped member disposed upon the edge of the bar adjacent the end opposite the hook, one of the legs of the U-shaped member being spaced from the bar and substantially parallel thereto, a flat spring secured to the bar and bent around the end at which the U-shaped member is disposed, forming a leg with the U-shaped member.

2. A chain tightener of the character described comprising a bar, a hook at one end thereof, a U-shaped member disposed upon the edge of the bar adjacent the end opposite the hook, one of the legs of the U-shaped member being spaced from the bar and substantially parallel thereto, a flat spring secured to the bar and bent around the end at which the U-shaped member is disposed, forming a leg with the U-shaped member, the outer edge of the spring being bevelled.

3. In a chain tightener of the character described, the combination with a chain, of a bar attached to one end thereof, a hook formed upon one end of the bar adjacent its point of attachment with said chain, a guide formed upon the upper edge of said bar, and integral with the bar, a spring attached to the bar, one end of said spring being bent toward the lower edge of the guide, and the said spring being bevelled for cooperation with the guide, substantially as and for the purposes set forth.

In witness whereof I have hereunto set my hand.

ROBERT GOLPHIN.